Sept. 3, 1935. J. B. BAKER 2,013,123
SECTIONAL BEARING CAGE
Filed Feb. 2, 1935
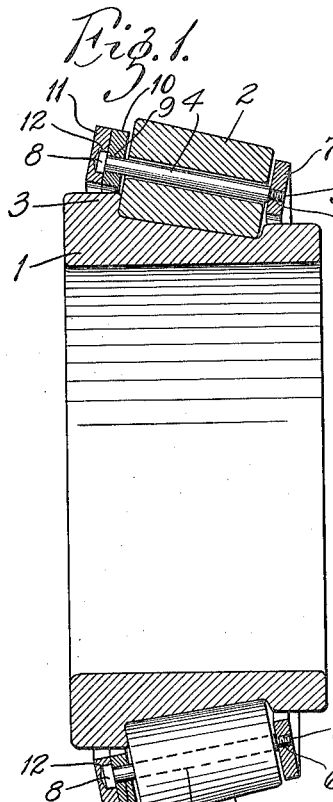
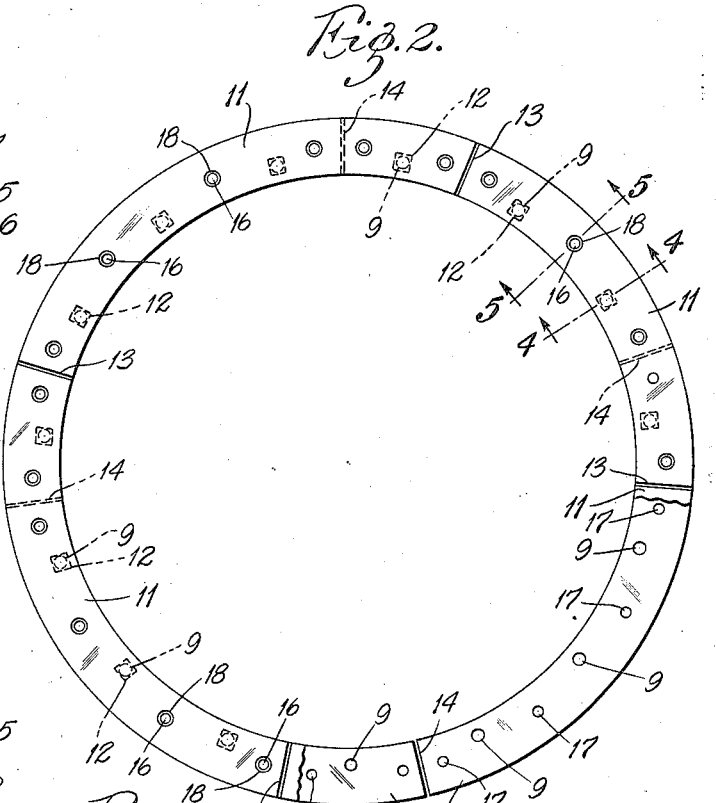
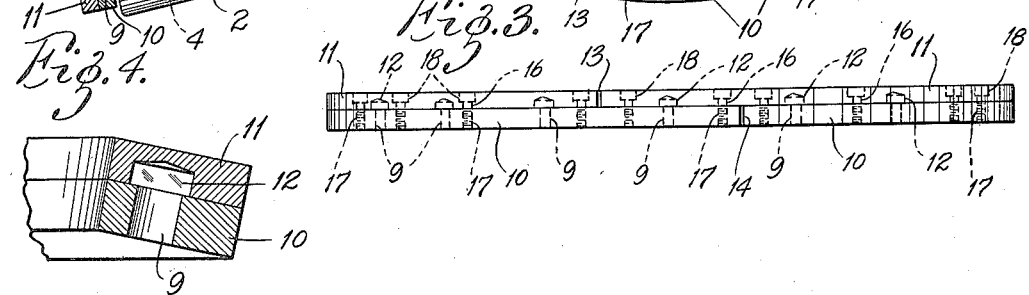
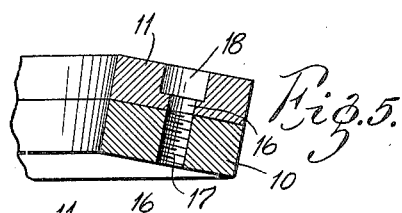
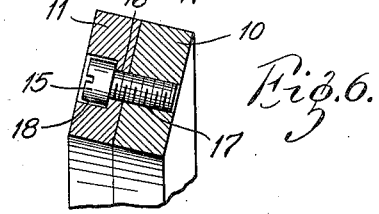
INVENTOR:
John B. Baker,
HIS ATTORNEYS.

Patented Sept. 3, 1935

2,013,123

UNITED STATES PATENT OFFICE 2,013,123

SECTIONAL BEARING CAGE

John B. Baker, Canton, Ohio, assignor to The Timken Roller Bearing Company, Canton, Ohio, a corporation of Ohio Application February 2, 1935, Serial No. 4,626

8 Claims. (Cl. 308—218)

My invention relates to cages for the rollers of roller bearings, particularly taper roller bearings of the kind whose rollers are hollow and whose cages have pins extending through the hollow rollers and mounted in rings at their ends.

The invention has as its principal object, a cage of this type which is easily assembled, which is light and at the same time rigid in construction and which can be partially dismantled to permit the removal of individual rollers without injury to the cage parts so that the same cage parts may be used in reassembling the bearing.

The invention is particularly concerned with the construction of the large end ring of the cage; and the invention consists principally in making the large end ring member in two flatwise opposed sections, each of which sections is made up of arcuate segments and in mounting the pins in holes extending through the innermost ring segments and with their heads received in depressions provided in the inner faces of the outermost ring segments. The invention further consists in the sectional bearing cage and in the parts and combinations and arrangements of parts hereinafter described and claimed.

In the accompanying drawing, wherein like symbols refer to like parts wherever they occur, Fig. 1 is a longitudinal sectional view of a bearing having a cage embodying my invention;

Fig. 2 is an end elevation or face view of the large end ring members with one of the outermost ring segments removed;

Fig. 3 is an edge view of the large end ring members;

Fig. 4 is a sectional view on the line 4—4 in Fig. 2;

Fig. 5 is a sectional view on the line 5—5 in Fig. 2; and

Fig. 6 is a sectional view showing the manner of securing outer and inner ring segments together.

Fig. 1 shows a cone or inner bearing member of a taper roller bearing on which are mounted conical rollers 2, a thrust rib 3 being provided at the large end of the raceway of said cone for engagement with the large ends of the rollers 2. Extending through each roller 2 is a pin 4 that projects from the roller at each end. The end 5 that projects beyond the smaller end of the roller is screwthreaded and is mounted in a threaded hole 6 provided therefor in a small end ring member 7.

The end of each pin 4 that projects beyond the large end of a roller 2 is provided with an enlarged head 8 which is preferably square or of some other polygonal shape. Each pin extends through a hole 9 provided therefor in an arcuate segment 10, the inner edges of the heads of said pins resting against the outer faces of said segments 10. Outer arcuate segments 11 are mounted flatwise against said inner segments 10, said outer ring segments 11 having square recesses 12 in their inner faces to receive the heads of said pins 4 and prevent them from turning.

The segments 10, 11 of the two ring sections are so disposed as to break joint, that is, the joints 13 between the outer ring segments are out of alinement with those 14 of the inner ring segment. The outer ring segments 11 are secured to the inner ring segments 10 by means of screws 15 extending through holes 16 in the outer ring segments 11 into threaded holes 17 in the inner ring segments, the holes 16 through the outer ring segments being provided with counterbores 18 so as to accommodate the heads of said screws 15.

In order to expose an individual roller 2, it is obviously necessary only to remove two outer ring segments 11 and the single inner ring segment 10 that covers that particular roller, loosen the pins 4 that extend through that particular inner ring segment and remove the pin extending through the individual roller, which releases that roller and allows it to be moved separately from the cage.

The above described construction simplifies the operation of removing and replacing an individual roller and it does not damage the parts of the cage. Obviously, numerous changes may be made without departing from the spirit of my invention. For example, the construction of the small end ring of the cage might be that disclosed in Vanderbeek Patent No. 1,884,925 dated October 25, 1932. Therefore, I do not wish to be limited to the construction shown and described.

What I claim is:

1. A sectional bearing cage for hollow bearing rollers, comprising pins extending through said hollow rollers and having threaded ends projecting beyond said rollers at one end and having enlarged heads projecting beyond said rollers at the other end, an end member having threaded holes receiving said threaded ends and a sectional end ring member for said headed ends of said pins, said sectional member comprising arcuate segments disposed between the ends of said rollers and the inner faces of said heads and having holes through which said pins extend, outer arcuate segments disposed flatwise against said first mentioned segments and releasable means securing said outermost segments to said innermost segments.

2. A sectional bearing cage for hollow tapered bearing rollers, comprising pins extending through said hollow rollers and having threaded ends projecting beyond the small ends of said rollers and having enlarged heads projecting beyond the large ends of said rollers, an end member having threaded holes receiving said threaded ends and a sectional end ring member for said headed ends of said pins, said sectional member comprising arcuate segments disposed between the ends of said rollers and the inner faces of said pin heads and having holes through which said pins extend, outer arcuate segments disposed flatwise against said first mentioned segments and releasable means securing said outermost segments to said innermost segments.

3. A sectional bearing cage for hollow tapered bearing rollers, comprising pins extending through said hollow rollers and having threaded ends projecting beyond the small ends of said rollers and having enlarged heads projecting beyond the large ends of said rollers, an end member having threaded holes receiving said threaded ends and a sectional end ring member for said headed ends of said pins, said sectional member comprising arcuate segments disposed between the ends of said rollers and the inner faces of said pin heads and having holes through which said pins extend, outer arcuate segments disposed flatwise against said first mentioned segments and breaking joint therewith and releasable means securing said outermost segments to said innermost segments.

4. A sectional bearing cage for hollow tapered bearing rollers, comprising pins extending through said hollow rollers and having threaded ends projecting beyond the small ends of said rollers and having enlarged heads projecting beyond the large ends of said rollers, an end member having threaded holes receiving said threaded ends and a sectional end ring member for said headed ends of said pins, said sectional member comprising arcuate segments disposed between the ends of said rollers and the inner faces of said pin heads and having holes through which said pins extend, outer arcuate segments disposed flatwise against said first mentioned segments and releasable means securing said outermost segments to said innermost segments, said outermost segments having recesses in their faces to accommodate the heads of said pins.

5. A sectional bearing cage for hollow tapered bearing rollers, comprising pins extending through said hollow rollers and having threaded ends projecting beyond the small ends of said rollers and having enlarged heads projecting beyond the large ends of said rollers, an end member having threaded holes receiving said threaded ends and a sectional end ring member for said headed ends of said pins, said sectional member comprising arcuate segments disposed between the ends of said rollers and the inner faces of said pin heads and having holes through which said pins extend, outer arcuate segments disposed flatwise against said first mentioned segments and releasable means securing said outermost segments to said innermost segments, said pin heads being of polygonal shape and said outermost segments having recesses in their faces to fit said pin heads.

6. A sectional bearing cage for hollow tapered bearing rollers, comprising pins extending through said hollow rollers and having threaded ends projecting beyond the small ends of said rollers and having enlarged heads projecting beyond the large ends of said rollers, an end member having threaded holes receiving said threaded ends and a sectional end ring member for said headed ends of said pins, said sectional member comprising arcuate segments disposed between the ends of said rollers and the inner faces of said pin heads and having holes through which said pins extend, outer arcuate segments disposed flatwise against said first mentioned segments and screws securing said outermost segments to said innermost segments.

7. A sectional bearing cage for hollow tapered rollers, comprising pins extending through said hollow rollers and having threaded ends projecting beyond the small ends of said rollers and having enlarged heads projecting beyond the large ends of said rollers, an end member having threaded holes receiving said threaded ends and a sectional end ring member for said headed ends of said pins, said sectional member comprising arcuate segments disposed between the ends of said rollers and the inner faces of said pin heads and having holes through which said pins extend, outer arcuate segments disposed flatwise against said first mentioned segments and screws securing said outermost segments to said innermost segments, said screws extending through holes in said outermost segments into threaded holes in said innermost segments.

8. A sectional bearing cage for hollow tapered bearing rollers, comprising pins extending through said hollow rollers and having threaded ends projecting beyond the small ends of said rollers and having enlarged heads projecting beyond the large ends of said rollers, an end member having threaded holes receiving said threaded ends and a sectional end ring member for said headed ends of said pins, said sectional member comprising arcuate segments disposed between the ends of said rollers and the inner faces of said pin heads and having holes through which said pins extend, outer arcuate segments disposed flatwise against said first mentioned segments and screws securing said outermost segments to said innermost segments, said screws extending through holes in said outermost segments into threaded holes in said innermost segments, said holes in said outermost segments being counterbored to accommodate the heads of said screws.

JOHN B. BAKER.